Jan. 29, 1963    C. W. BROWN ET AL    3,076,192
AUTOMATIC RADIO NAVIGATION
Original Filed Nov. 3, 1948    3 Sheets-Sheet 1
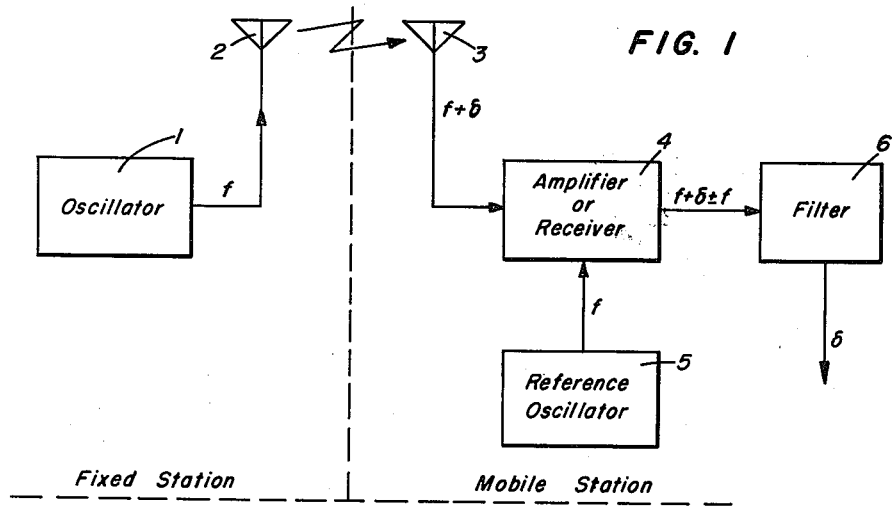
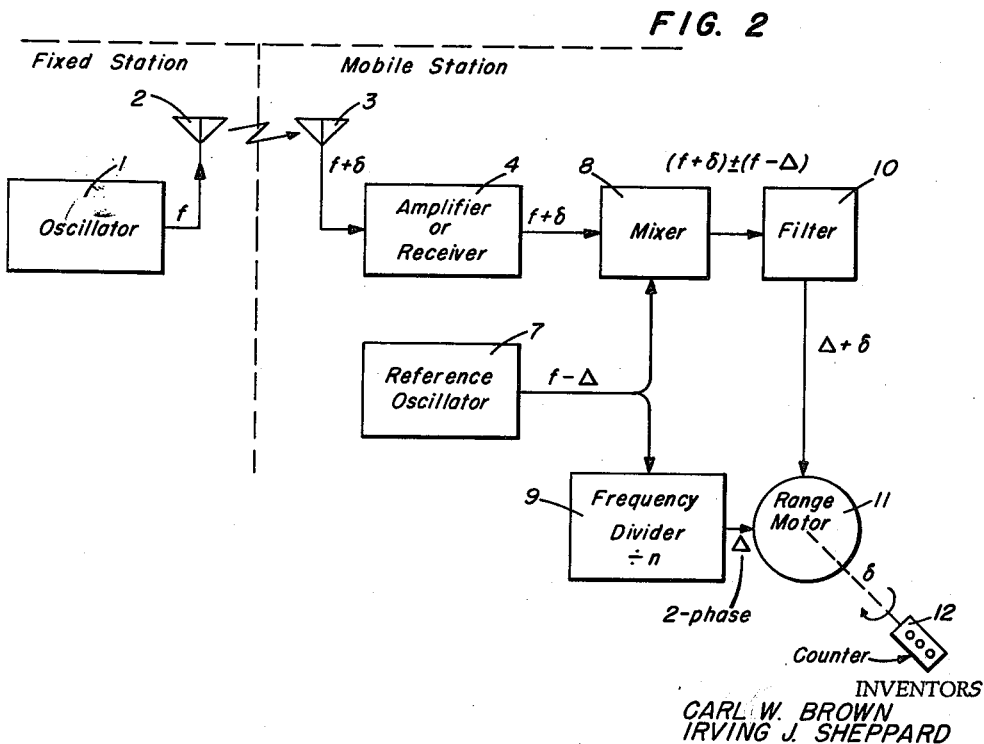
INVENTORS
CARL W. BROWN
IRVING J. SHEPPARD
FRANK D. WERNER
BY
ATTORNEY

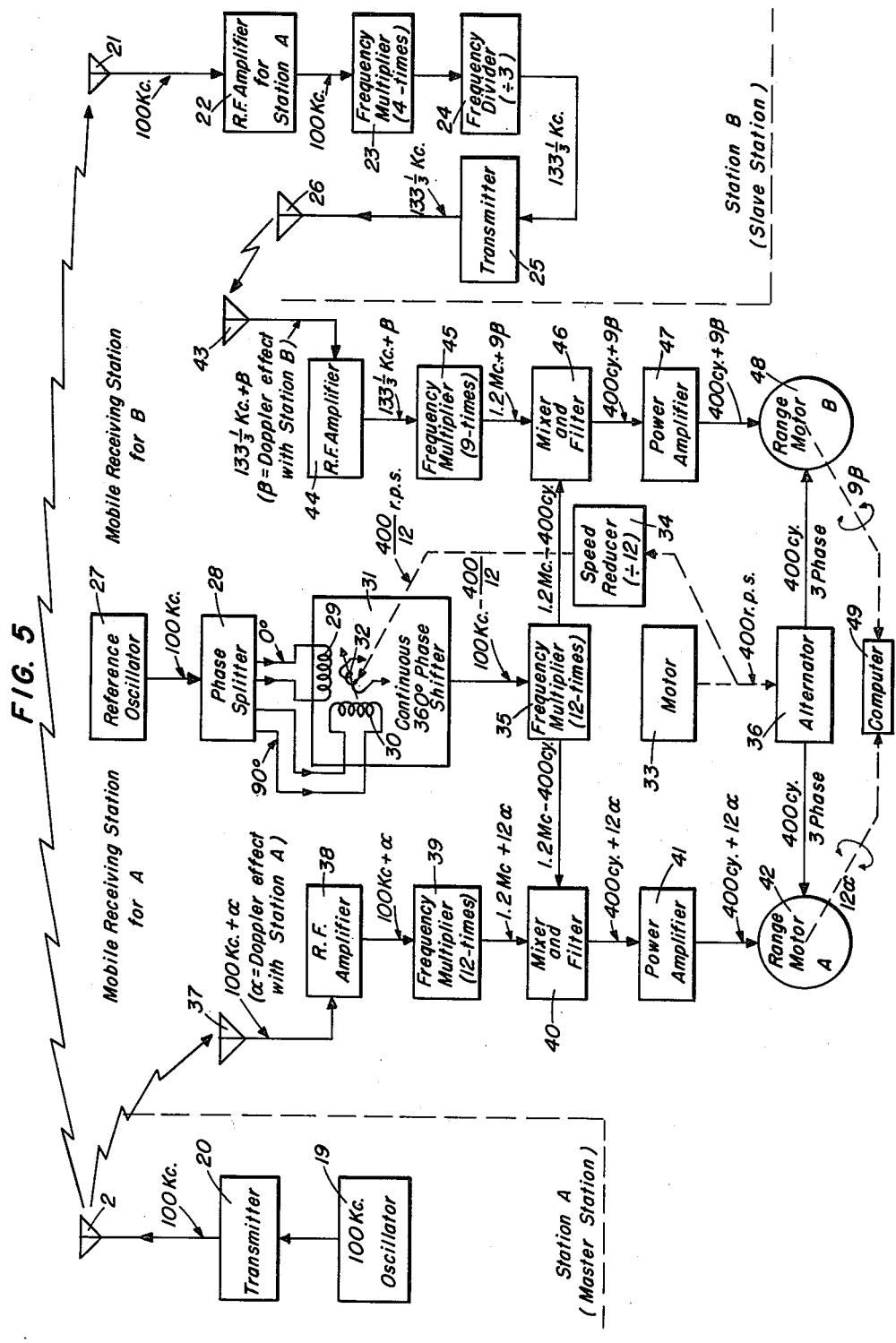

3,076,192
Patented Jan. 29, 1963

3,076,192
AUTOMATIC RADIO NAVIGATION
Carl W. Brown, Silver Spring, and Irving J. Shepperd, Kensington, Md., and Frank D. Werner, Rosemount, Minn., assignors to the United States of America as represented by the Secretary of the Navy
Original application Nov. 3, 1948, Ser. No. 58,102, now Patent No. 3,025,519, dated Mar. 13, 1962. Divided and this application Jan. 29, 1959, Ser. No. 796,719
5 Claims. (Cl. 343—112)

The present invention relates to automatic radio navigation. More specifically, it relates to a system for guiding vehicles, including missiles, by radiant energy emitted simultaneously from two synchronized transmitting stations, spaced apart a suitable distance, the missile being equipped with appropriate receiving apparatus. Certain components of the system are also useful as a precision phase meter.

This application is a division of copending applicaton Serial No. 58,102, filed November 3, 1948, now Patent No. 3,025,519, by the present applicants.

Heretofore no satisfactory procedure for guiding vehicles over long ranges has been available, due to the lack of proper systematic design principles that would yield effective automatic guidance for other than relatively short distances. While beams of radiant energy were suggested for this purpose, they were open to the very serious objection that even an extremely narrow beam has a considerable linear transverse spread when the range becomes large. For example, a ½ degree beam at 100 mile range is about a mile across, so that even if such a narrow beam could be provided successfully, and the missile or other vehicle were confined within it, it might miss the target by a half-mile or more, even at a range of only 100 miles. The present invention, by making use of a Doppler effect, can reduce the probable error to about 250 feet in lateral deviation from the intended course for a range of approximately 700 miles, obviously a very great increase in approach to precision, over the prior procedure.

An object of the present invention is to provide an improved system for automatic long range guidance of vehicles.

A further object is to provide a procedure and apparatus for long range guidance based on synchronized radio transmissions, which produce beats due to the Doppler effect when received by the moving vehicle, which may be a guided missile.

Other objects and many of the attendant advantages of this invention will be appreciated readily as the same becomes understood by reference to the following detailed description, when considered in connection with the accompanying drawings, wherein:

FIG. 1 is a block diagram, illustrating some of the principles underlying the invention;

FIG. 2 is a block diagram showing one way of determinig whether the range of the vehicle is increasing or decreasing;

FIG. 5 is a block diagram of a complete installation for guiding a vehicle, including the two fixed transmitters and the receiver carried by the vehicle, together with auxiliarly devices.

Figure 3:
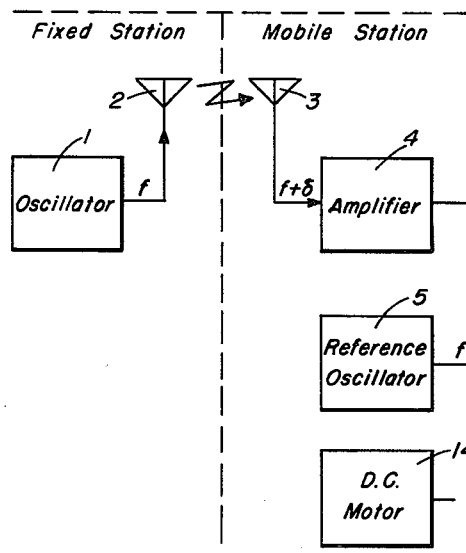
FIG. 3 is a block diagram showing a different way of accomplishing the same purpose.

Referring first to FIG. 1, there is shown a fixed station including an oscillator 1, which continuously emits radiant energy of an unvarying frequency $f$, from its antenna 2.

The mobile station, carried by the vehicle, has an antenna 3 that receives energy from the transmitter at the fixed station. Owing to the fact that the distance between these two stations is assumes to be varying, due to the motion of the vehicle, the frequency received at the mobile station will not be identical with that generated by the oscillator 1, but will gain or lose a cycle for every change of a wave length in the range, in accordance with the well-known Doppler principle.

This altered frequency $f+\delta$, received by the antenna 3, is fed into the amplifier or receiver 4, wherein it is mixed or heterodyned with output energy from a reference oscillator 5, which is adjusted to be exactly synchronized with the oscillator 1. At this point, it should be noted that $\delta$ may be either positive or negative, as determined by decreasing or increasing range.

As a result of combining the energy of frequency $f$ with that received from the antenna 3, a sum or difference frequency $(f+\delta) \pm f$ will be produced by the amplifier or receiver 4. The corresponding output is fed to the filter 6 which produces therefrom solely the quantity $\delta$. Since this represents the number of cycles gained or lost by the mobile station and since each cycle has a definite length, equal to the wave length, the difference in radial range is thus made known.

Unfortunately, however, the sign, plus or minus, of $\delta$ is not made known by this simple apparatus, so that it is not known whether the mobile station is approaching or receding with respect to the fixed station.

Figure 4:
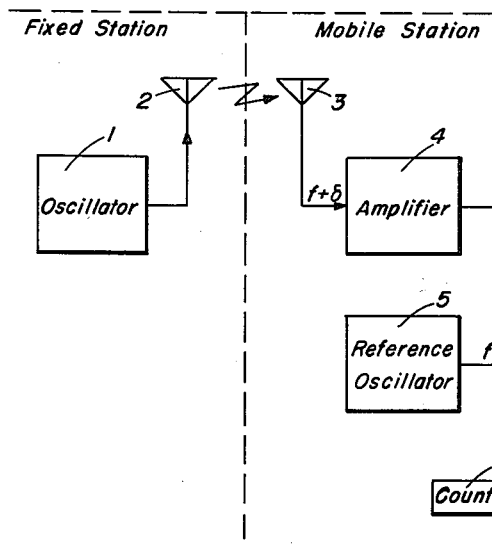
FIG. 4 is a block diagram showing a third way of doing this.

In order to determine this sign, several alternative devices and procedures are disclosed as FIGS. 2, 3 and 4.

Taking up first FIG. 2, the oscillator 1, antenna 2, antenna 3, and amplifier or receiver 4 are, or may be, the same is in FIG. 1. However, the reference oscillator 7, which takes the place of reference oscillator 5 of FIG. 1, here has an intentionally offset frequency, that is, it operates at the frequency $(f-\Delta)$ instead of at the standard frequency $f$. This new frequency $(f-\Delta)$ is adjusted carefully to the value $n\Delta$ so that the new frequency is an integral multiple of the difference $\Delta$ between the new frequency $(f-\Delta)$ and the standard frequency $f$, which involves merely a simple observation of the "$\delta$" shaft of a range motor 11, as will be understood later.

The output from oscillator 7 feeds two ways, one portion going into a mixer 8, and the other into a frequency divider 9. The portion that enters the mixer 8 is there heterodyned with the frequency $f+\delta$ delivered by the amplifier or receiver 4, with the result that the sum and/or difference frequencies $(f+\delta)\pm(f-\Delta)$ are derived from mixer 8 and supplied to the input of a filter 10. This filter 10 is designed to remove the high frequency component, and yield an output of the frequency $\Delta+\delta$. In arriving at this result it may be desirable to explain that while offhand it might be seen that $-\Delta+\delta$ would also be produced, in case the double sign is taken as +, the "delta" frequencies do not exist individually as such in the original inputs to the mixer 8, that is $(f+\delta)$ and $(f-\Delta)$ represent single frequencies. Hence the sum of these two is a large frequency of the same order of magnitude as $2f$, which is rejected by the filter 10.

The portion of the reference oscillator output that enters the frequency divider 9 is there mainpulated to divide its frequency $n$. Thus inasmuch as this frequency $(f-\Delta)$ is equal to $n\Delta$, the frequency division will yield the frequency $\Delta$. Energy at this frequency $\Delta$ is fed to the stator windings of the range motor 11. This is a 2-phase motor, and preferably the output of the frequency divider 9, appropriately divided into two voltages differing 90° in phase, supplies both phases, although other ways are conceivable.

The range motor 11 has also a wound rotor, which receives the output from the filter 10. If this were also of frequency Δ, the stator and rotor fields would rotate in unison, with the result that no torque would be developed, and the rotor would remain at rest. However, whenever there is a δ frequency in addition to the Δ in the rotor field, rotation at the corresponding rate will ensue. Consequently, a revolution counter 12 actuated by the shaft of this motor 11 will count or integrate the turns of this rotor shaft, giving the change in the range. This will take account of both signs of δ, due to the fact that plus and minus values will cause the shaft to turn in opposite senses. In the FIG. 2 system the rate of rotation is proportional to δ and the direction to the sign of δ. The motor 11 may conveniently be a "servo control transformer," having a 2-phase stator and a 1-phase rotor.

A second way to solve the same problem is shown in FIG. 3. Here elements 1, 2, 3, 4, 5, 8, 10 and 12 are the same as already described for FIG. 2. The reference oscillator 5, instead of feeding directly into the mixer 8 as in FIG. 2, now has a continuous 360° phase shifter 13 interposed between it and mixer 8. The output of the reference oscillator is first subjected to a phase-splitting network to provide two time-quadrature voltages to the phase shifter 13. If this phase shifter is driven by a motor, it acts as a single sideband modulator producing an output frequency which is the sum, or difference, depending on the direction of shaft rotation, and the rotating field of the quadrature windings. This phase shifter operates on exactly the same principle as the range motor 11 of FIG. 2. However, in the present case, a mechanical input is combined with an electrical input to give a modified electrical output, the reverse of the function performed by the range motor.

A motor 14, here arbitrarily designated as D.C. drives both the phase shifter 13 and a 3-phase alternator 15 at a rate Δr.p.s. For the present discussion, the output of the phase shifter 13 has been taken to be $(f-\Delta)$. This is mixed with the signal received from the fixed station and passed through the filter 10, yielding $(\Delta+\delta)$.

This frequency is applied to a range motor 16, corresponding functionally to motor 11 of FIG. 2, but with its stator excited with 3-phase energy from the 3-phase alternator 15, a shaft rotation at a rate δ will be produced, as in the preceding case. Obviously, a change in the speed of drive motor 14 does not affect the range shaft output. Moreover, here 3-phase has been indicated arbitrarily, partly to illustrate the fact that the 2-phase operation of FIG. 2 is not necessarily the only suitable way.

A third circuit arrangement that is simpler than that of FIG. 3, but perhaps equally satisfactory, is shown in FIG. 4. This has elements 1, 2, 3, 4, 5, 12 and 13 the same as those in FIG. 3. Instead of the mixer 8 of FIG. 3, however, a phase detector 17 here receives the combined outputs of the amplifier 4 and the continuous 360° phase shifter 13.

The frequency difference between the received frequency, $f+\delta$, and the reference oscillator frequency, $f$, may be considered instantaneously as two voltages differing only in phase. Hence, comparing these two voltages in the phase sensitive detector, 17, will result in the production of a D.C. voltages whose magnitude is proportional to the phase angle difference between the two signals, and whose polarity is determined by which signal leads the other in phase. The output of the phase detector 17 may be made zero by shifting the output of the reference oscillator 5 to agree in phase with the received signal of frequency $f+\delta$. This is accomplished by adjustment of the phase shifter 13. This action is made automatic by properly connecting the output terminals of the phase detector 17 to the terminals of a fixed field D.C. motor 18. The direction of rotation of the motor 18 and phase shifter 13 shaft is determined by the relative phase of the two signals compared in the phase detector 17 and the rate of rotation is determined by the magnitude of the phase difference. The motor 18, in turn, operates the phase shifter 13 until balance is restored in the phase detector 17. Since the distance between the mobile station and the fixed station causes the phase of the received signal to change, whereby the phase detector becomes unbalanced and the resultant voltage thus drives the phase shifter 13 through motor 18, it follows that the output of the reference oscillator 5 is always matched to the phase of the received signal. The counter 12 measures the net shift of the phase shifter 13, which is also a measure of the net change in separation of the mobile from the fixed station.

A complete system for position determination in a constant-altitude plane will now be described, with reference to FIG. 5. At station A, the master station, there is a 100 kc. oscillator 19 which controls the frequency of a transmitter 20, which in turn energizes the antenna 2, to radiate at said frequency. The oscillator 19 is capable of maintaining constant frequency within extremely small error tolerance, for very long periods.

At another station, designated B, and called the slave station, which is at a known distance and direction from station A, an antenna 21 receives some of the radiation from station A, and feeds it to a radio-frequency amplifier 22, then the output of said amplifier, in turn, is fed to a frequency multiplier 23, where in this particular instance the frequency is multiplied by 4, thus producing 400 kc.

Next, the output of the frequency multiplier 23 passes through the frequency divider 24, where it is divided by 3, thus yielding 133⅓ kc. This frequency is then used to control the frequency of a transmitter 25, that energizes an antenna 26 to radiate at a frequency, namely, 4/3 the original 100 kc. of station A. Inasmuch as this relation holds strictly true, the frequency radiated from antenna 26 of the slave station B is synchronized with that of the master station A. The reason for transmitting on separate frequencies is to make it possible to distinguish between the signals of the master and slave stations.

The central portion of FIG. 5, between stations A and B, represents the equipment of the mobile station. This carries a reference oscillator 27, that generates the same frequency as oscillator 19, here 100 kc. The output of oscillator 27 passes to a phase splitter 28, which provides therefrom two components at 90 electrical degrees to one another, in other words, conventional 2-phase current. These two currents are supplied to the respective stator windings 29 and 30 of a continuous 360° phase shifter 31. This has a wound rotor 32, in the field of the two stator windings 29 and 30, which thus will have induced therein a voltage determined by difference of the rate of rotation of the stator field and the rate of mechanical rotation of the rotor 32.

This rotation is provided by a motor 33, through a speed reducer 34, which here divides the motor speed by 12. Since motor 33, here assumed to be two-pole type, driven synchronously by 400 cycle 3-phase current, operates at 400 r.p.s., this means that the rotor 32 will rotate at 400/12 r.p.s. Consequently the frequency output of the rotor is 100 kc., minus 400/12 cycles. In order to be able to compare the received frequencies with that of the reference oscillator, it is necessary to change to a common frequency. Here it is expedient to make this common frequency 1200 kc. per second.

This output frequency is next multiplied by 12 in a frequency multiplier 35. This eliminates 12 in the denominator of the fraction, thus getting the new frequency of 1200 kc.–400 cycles from the multiplier 35. The motor 33 also drives an alternator 36, which generates 3-phase 400 cycle current, which is caused to coact with other currents, as will also be explained presently.

It will be seen that the mobile station has two receiving circuits, each with its own antenna. An antenna 37 cooperates with the transmitter at station A, that is, it and a radio-frequency amplifier 38 connected thereto are tuned to the frequency of station A, here 100 kc. However, this frequency is no longer that actually emitted by antenna 2, but differs somewhat therefrom, due to the Doppler effect when the vehicle is in motion. In general, the frequency becomes 100 kc.+α, where alpha is negative when the distance between transmitter and receiver is increasing, as is normally the case.

The received frequency is next multiplied, by 12 in this case, by means of a frequency multiplier 39, yielding the new frequency 1200 kc.+12α. This is combined, in a mixer and filter 40, with the frequency 1200 kc.−400 cycles derived from the frequency multiplier 35, already discussed, with the result that only the relatively low difference frequency, 400 cycles+12α, will be passed to the power amplifier 41.

This amplifies said output, to give sufficient power to operate a range motor 42, in cooperation with the 400 cycle 3-phase energy supplied simultaneously by the alternator 36. This range motor 42 has its stator energized by the 3-phase 400 cycle power from the alternator 36, while its wound rotor receives the 400 cycle+12α frequency from the amplifier 41, and thus the rotor will turn at a rate equal to the difference of those two excitation frequencies, here 12α, assuming a two-poles per phase winding.

The apparatus for operating a second range motor 48 from an antenna 43 is exactly of the same types as that just described, and consists of a radio frequency amplifier 44, a frequency multiplier 45, here giving a 9-times multiplication (to produce 1200 kc. from the 133⅓ kc.), a combined mixer and filter 46, and a power amplifier 47. The shaft of this range motor 48 will rotate at the rate 9β.

The shafts of the two range motors, 42 and 48, will thus turn at rates corresponding to the rates of change of range of the two fixed stations, while the total number or fractional parts of turns of each is a measure of the corresponding range. These shafts may therefore operate suitable integrators or other measuring or indicating devices, such as a computer 49, for example, which may be of any desired type.

At this point, it may be desirable to discuss the numerical meanings of the quantities α and β. The velocity of radiant energy in space is approximately 300,000,000 meters per second. Thus with a frequency of 1200 kc., that is 1,200,000 cycles per second, each cycle means 250 meters. It will be noted that the 1200 kc. value applies to both the transmitting stations, hence for each range motor 42 or 48, one cycle, that is, one revolution of the shaft, means 250 meters distance.

In order to navigate it is necessary to obtain a position or "fix" with respect to known reference points. Since three ranges determine a triangle it would be expedient to use the distance between the master station A and slave station B for one of the known ranges and the range motor data for the other two known distances. A computer 49 could be built to operate with these data. By comparison with desired position data an automatic steering system for a vehicle could be designed.

For guided missile operation a very suitable course or trajectory would be along a hyperbola generated with the two ground stations as the foci. This could be generated by comparing the two range motor outputs by means of a mechanical differential, such that the output shaft position indicates the difference between the two range motor positions. When the vehicle deviates from the hyperbola the differential output shaft rotates in such direction as to indicate the sense of the deviation. This method has the advantage that range errors, which always are the same for both master and slave, cancel in the generation of the true hyperbolic path. Range data must be taken from one or both of the range motors to determine the position along the path. This is most accurately determined by using a range summing mechanical differential.

Summarizing, it should be realized clearly that at least four different quantities may be obtained by use of the present invention, the two simpler ones being the range or distance of the mobile station from the stationary station, and the "range rate," that is, the rate of change of said range, more simply designated as the speed.

If both the range and the range rate are required, the local or reference oscillator must be fully synchronized with the master oscillator; that is, both the frequency and the phase angle must be synchronized. Thereby the phase angle becomes proportional to the range or distance and the frequency difference, or Doppler frequency, represents the range rate or speed. Unless the reference oscillator is synchronized with the master oscillator in relation to zero distance between them, the indication of distance may be erroneous. That is, the distance indication may be off by a given range and remain in error. For example, if the distance between the moving station and the reference station is off by five wavelengths at the time of initial measurement, the indication will remain off by five wavelengths until it is corrected. For this reason the distance has to be set initially, or in short, the two oscillators have to be synchronized.

If only the speed is required, it is not necessary fully to synchronize the two oscillators, but merely to bring them to the same frequency. This will still provide the same Doppler frequency, which is not dependent in any way on the phase angle.

The third and fourth possible measurements are the determination not only of the range and speed, but also of the exact location and velocity of the vehicle. This requires two stationary transmitter stations, with their frequencies and phase angles interlocked to keep a definite relation between them, that is, between the master and slave stations A and B, respectively. However, this does not mean that their transmitted frequencies and phase angles necessarily are the same, as will be clear from FIG. 5, wherein the frequency ratio of the stations is 3 to 4.

Such complete system yields not only the range and range rate, but also the actual position of the mobile station, and its velocity, that is, speed and direction of motion combined.

It is to be understood also that in the present specification and in the claims, the term synchronism and derivatives of said term, mean coincidence of both frequency and phase angle, as distinguished from mere equality of frequencies. It is also to be remembered that the phase angle is not limited to 360°, but represents the totalized angle, which may grow indefinitely with the range, increasing by 360° for each additional cycle.

Obviously many modifications and variations of the present invention are possible in the light of the above teachings. It is therefore to be understood that within the scope of the appended claims the invention may be practiced otherwise than as specifically described.

What is claimed is:

1. A radio range and range rate determining system, comprising a stationary source of constant frequency oscillations, means coacting therewith to radiate said oscillations, a movable vehicle, a local mobile source of constant frequency oscillations carried by said vehicle and maintained in predetermined phase and frequency relationship with said stationary source of constant frequency oscillations, a receiver carried by said vehicle for receiving the radiation from said stationary source, phase detecting means carried by said vehicle for combining the received oscillations as shifted by the Doppler effect with the local oscillations for determining the phase difference and frequency difference of the combined oscillations, frequency changing means connected to said mobile frequency source, frequency combining means connected to receiver means and said frequency changing means, said combining means eliminating said constant frequency, means responsive to combined frequency and the frequency increment whereby the phase and frequency differences between the oscillations received from the stationary source and the oscillations generated by the mobile source will be proportional to the range and range rate of said movable vehicle with respect to said stationary source of oscillations.

2. A radio range and range rate determining system, comprising a stationary source of constant frequency oscillations, means coacting therewith to radiate said oscillations, a movable vehicle, a local mobile source of constant frequency oscillations carried by said vehicle and maintained in predetermined phase and frequency relationship with said oscillations from said source of constant frequency, said mobile source of constant frequency oscillations differing in frequency from said stationary source of constant frequency, the frequency magnitude of said mobile source of constant frequency being an integral multiple of the differerence between the two frequencies, a receiver carried by said vehicle for receiving radiations from said stationary source, means carried by said vehicle for combining the received oscillations with the local oscillations and means carried by said vehicle for detecting the phase difference and frequency difference of the combined oscillations, a frequency changer connected to said mobile source of constant frequency for changing the frequency by a given increment, a frequency combining means connected to said receiver and said frequency changer and eliminating said constant frequency, indicating means connected to said frequency changer and said frequency combiner whereby the phase and frequency differences between the oscillations received from the stationary source and the oscillations generated by the mobile source will be proportional to the range and range rate of said movable vehicle.

3. A radio range and range rate determining system, comprising a stationary source of constant frequency oscillations, means coacting therewith to radiate said oscillations, a movable vehicle, a local mobile source of constant frequency oscillations carried by said vehicle and maintained in predetermined but differing phase and frequency relationships with said stationary source of constant frequency oscillations, a motor carried by said vehicle having at least one rotor winding and one stator winding, means carried by said vehicle for combining the frequency oscillations as shifted by the Doppler effect and received from said stationary source with the frequency oscillations from said mobile source and eliminating said constant frequency component and applying the difference frequency to one set of windings of said motor, means for applying the frequency by which the mobile source of frequency oscillations differs from the stationary source of frequency oscillations to another winding of said motor whereby the resultant total motor rotation will be proportional to the range of the movable vehicle and the rate and direction of motor rotation will be proportional to the range rate of the movable vehicle.

4. A radio range and range rate determining system, comprising a stationary source of constant frequency oscillations, means coacting therewith to radiate said oscillations, a movable vehicle, a receiver carried by said vehicle for receiving the Doppler shifted radiations from said stationary source, a local mobile source of constant frequency oscillations carried by said vehicle and synchronous with said stationary source of constant frequency oscillations, means carried by said vehicle including a rotatable phase shifter for modulating the output of said local mobile oscillator, an alternator, a motor for driving said phase shifter and said alternator, a range motor having at least one stator winding and one rotor winding, means carried by said vehicle for combining the output signal of said phase shifter with the signal received from said stationary source and applying the resultant difference signal to one of the windings of said range motor, means carried by said vehicle for applying the output of said alternator to the other of said range motor windings whereby the resultant total motor rotation will be proportional to the range of the movable vehicle and the rate and direction of motor rotation will be proportional to the range rate of the movable vehicle.

5. A radio range and range rate determining system, comprising a stationary source of constant frequency oscillations, means coacting therewith to radiate said oscillations, a movable vehicle, a receiver carried by said vehicle for receiving the radiations from said stationary source, a local mobile source of constant frequency oscillations carried by said vehicle and synchronous with said stationary source of constant frequency oscillations, means carried by said vehicle including a phase shifter for modulating the output of said local mobile oscillator, an indicating device, a D.C. motor connected to drive said phase shifter and said indicating device, phase detection means carried by said vehicle connected to provide an output voltage to said motor proportional to the phase difference between the radiation received as shifted by the Doppler effect from said stationary source and said phase shifter whereby the resultant total motor rotation will be proportional to the range of the vehicle and the rate and direction of motor rotation will be proportional to the range rate of the vehicle.

References Cited in the file of this patent

UNITED STATES PATENTS

| | | |
|---|---|---|
| 1,495,616 | Simpson | May 27, 1924 |
| 1,562,485 | Affel | Nov. 24, 1925 |
| 1,639,667 | Ranger | Aug. 23, 1927 |